Feb. 10, 1942. L. SZUMKOWSKI Re. 22,023

SWEATBAND FOR HATS

Original Filed Sept. 28, 1938

Inventor:
Leonard Szumkowski.
By B. Pelechowicz Atty.

Reissued Feb. 10, 1942

Re. 22,023

UNITED STATES PATENT OFFICE 22,023

SWEATBAND FOR HATS

Leonard Szumkowski, Chicago, Ill.

Original No. 2,218,590, dated October 22, 1940, Serial No. 232,019, September 28, 1938. Renewed February 26, 1940. Application for reissue May 12, 1941, Serial No. 393,104

7 Claims. (Cl. 2—181)

The present invention relates to sweatbands for hats and the principal object of the invention is the provision of a sweatband which would permit passage of air therethrough into the hat.

It is a known fact that hats pressing upon the head blood vessels retard or prevent circulation of blood, and therefore a further object of the present invention is the provision of a hatband which would reduce the pressure upon the wearer's head, and this object is accomplished by providing the hatband with a plurality of raised or embossed protuberances or ridges which would contact with the wearer's head and thus obviate the sweatband by its entire area from contacting with the wearer's head.

A still further object of the present invention is the provision of a sweatband of the character indicated which may be provided with a plurality of raised, embossed protuberances or ridges with resulting recesses or passages therebetween, the first permitting contact of the sweatband with the wearer's head, while the latter permitting unobstructed passage of the air into the hat and thereby serve as ventilating means for the hat.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views.

Referring in detail to the present drawing there is shown therein a sweatband generally indicated by 10 which is adapted for positioning within crown 11 of the hat and to which the same may be attached by stitches or by any other conventional means. The rim of the hat is indicated by 12.

Figure 1:
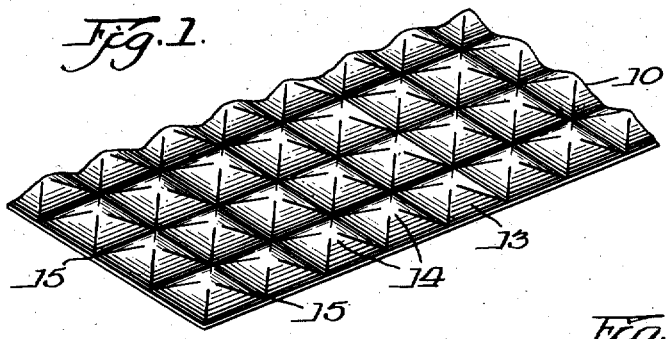
Fig. 1 is a fragmentary, enlarged perspective view of a sweatband.
Figure 4:
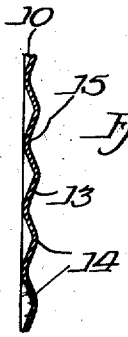
Fig. 4 is an enlarged, transverse cross-sectional view through the sweatband, the view having been taken substantially on line 4—4 of Fig. 2.

The sweatband has embossed or otherwise impressed thereon throughout its entire length and width, a plurality of uniformly arranged and spaced pyramidal protuberances 13, each having an apex 14. As is clearly seen in Fig. 1, said pyramidal protuberances 13 may have square bases, and are uniformly arranged longitudinally as well as transversely of the sweatband. A pair of adjacent rows of said pyramidal protuberances 13, both transversely and longitudinally of the sweatband define a longitudinal recess 15, the bottom of which is disposed adjacent the bases of said pyramidal protuberances 13 and defined by the sides thereof.

Figure 2:
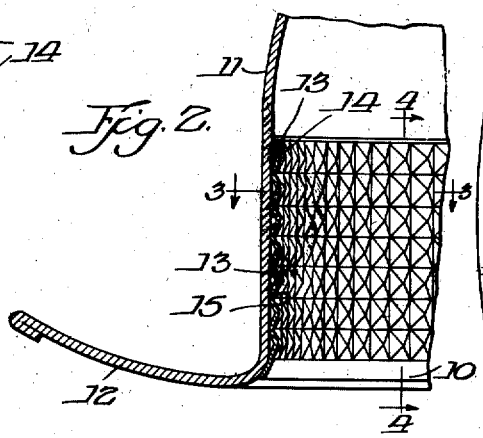
Fig. 2 is a cross-sectional view through the hat showing the sweatband in an operative position therewith.
Figure 3:
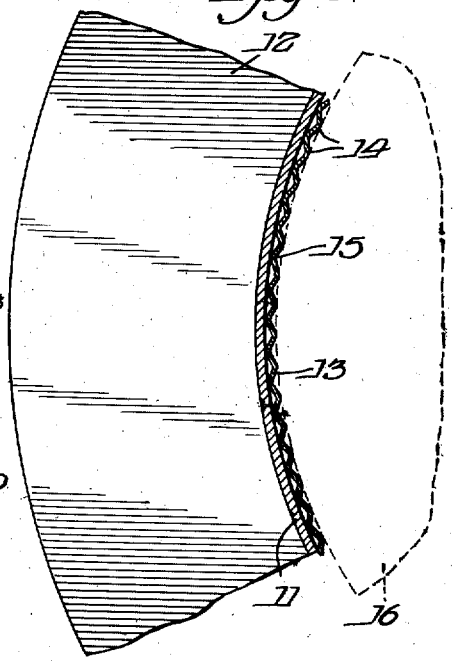
Fig. 3 is a cross-sectional view on a horizontal plane through the hat crown showing the position of the sweatband with respect to a wearer's head, the view having been taken substantially on line 3—3 of Fig. 2.

In the operative position of the hat and of the sweatband upon wearer's head, the latter being indicated by 16, the transverse rows of recesses 15 will remain in a vertical position with relation to the wearer's head, as is seen in Figs. 2 and 3, and will constitute vertical passages which will be defined by the adjacent sides of said pyramidal protuberances 13 and wearer's head 16, for permitting free and unimpeded passage of air from the outside into the hat crown 11 or vice versa. Thus, these transverse recesses 15 will afford an exchange or circulation of air into or from the hat crown, and will thus add to the sanitary qualities of the hat. In addition they will render the hat more comfortable by providing ventilation and reducing perspiration.

The apices 14 of said pyramidal protuberances 13, which may be blunt and of small area, and disposed and pointing outwardly therefrom, will contact with the wearer's scalp, when the hat is in an operative position upon the head as seen in Fig. 3, thereby reducing considerably the contacting area of the sweatband with the wearer's head, because only said apices 14 will remain in contact with a wearer's head, thereby correspondingly reducing the pressure of the sweatband which normally would be exerted thereby upon the blood vessels of the scalp, and without detracting in any manner from the degree of contact between the sweatband with the scalp in order to maintain the hat upon the wearer's head.

From the construction of a sweatband hereinabove described it will be seen that two main advantages of a sweatband herein described, are, first, provision of ventilating means for a hat, and second, reduction or almost practical elimination of a pressure which normally a conventional sweatband would exert upon a scalp.

Although I have shown herein a preferred form of a sweatband, it is not my desire to limit myself to the particular construction of a sweatband herein shown and described for accomplishing the above enumerated objects, as obviously protuberances of various shapes may be made in a sweatband not necessarily of pyramidal shape. Neither do I wish to limit myself to the uniform arrangement of the protuberances. Any shape or arrangement of protuberances in a sweatband will answer the purpose as long as said protuberances define contact areas of small dimensions for contacting with the scalp and define recesses, whether uniform or otherwise, which would permit unimpeded passage of air therethrough.

To accomplish the desired result, broadly, said protuberances may be in the shape of corrugations, uniform or irregular projections imparting to the surface of the sweatband a rough or coarse finish or embossed ridges of any shape. In order to impart to the sweatband the protuberances and co-operating or resulting recesses therebetween, either of the character shown in the drawing or herein mentioned, the hatband may be passed through a suitable die, which would impress or emboss said protuberances and recesses quite permanently when made on stiff material such as imitation leather or the like.

While there is described herein a preferred embodiment of the present invention, it is nevertheless to be understood that minor changes may be made therein without departing from the spirit and scope of the invention as claimed.

What I claim as new is:

1. A hatband comprising a single elongated strip embossed to form hollow tapered head-engaging projections substantially throughout its entire area, said projections being of substantially pyramidal form and depressed from the outer to the inner face of the strip to provide spaced point contacts of the projections at their apices with the head, and further being arranged in straight rows transversely of the strip to afford passages therebetween for the circulation of air into and from the interior of the hat between the band and the head.

2. A hatband comprising a single elongated strip of stiff material embossed to form hollow tapered head-engaging projections substantially throughout its entire area, said projections being of substantially pyramidal form and depressed from the outer to the inner face of the strip with their bases adjoining to provide spaced point contacts of the projections at their apices with the head, and further being arranged in straight rows transversely and longitudinally of the strip to afford passages therebetween for the circulation of air around the band and into and from the interior of the hat between the band and the head.

3. A hatband comprising a single elongated strip embossed to form hollow tapered head-engaging projections, said projections being of substantially pyramidal form and depressed from the outer to the inner face of the strip to provide spaced point contacts of the projections at their apices with the head, and further being arranged in rows transversely of the strip with a plurality in each row to afford passages therebetween for the circulation of air into and from the interior of the hat between the body of the strip and the head.

4. A hatband comprising an elongated strip embossed with a plurality of hollow stud-like head-engaging projections, said projections being of tapering form with their wider bases in a co-planar relation with the body of the strip and depressed from the outer to the inner face of the strip to provide spaced point contacts of the projections at their apices with the head, each adjacent pair of said head-engaging projections effecting recesses for affording passage therebetween for the circulation of air into and from the interior of the hat between the body of the strip and the head.

5. A hatband comprising a single elongated strip having an area embossed to form head-engaging projections, said projections being of tapering form with their wider bases in a substantially co-planar relation with the body of the strip and depressed from the outer to the inner face of the strip to provide spaced point contacts of the projections at their apices with the head, and further being arranged in rows to effect recesses for affording passages therebetween for the circulation of air into and from the interior of the hat between the body of the strip and the head.

6. A hatband comprising a single elongated strip having an area embossed to form frustum-like projections, depressed from the outer to the inner face of the strip with their wider bases in a substantially co-planar relation with the body of the strip and with their narrower ends in spaced relation with the body of the strip, to provide at their narrower ends contacts with the head, and further being arranged in rows transversely of the strip to afford passages therebetween for the circulation of air into and from the interior of the hat between the body of the strip and the head.

7. A hatband comprising a single elongated strip having an area embossed to form head-engaging projections depressed from the outer to the inner face of the strip to provide at their outer ends spaced point contacts with the head, said projections being wider at their bases and narrower at their outer ends, the bases being in a substantially co-planar relation with the body of the strip, said projections further being arranged in rows to effect recesses for affording passages therebetween for the circulation of air into and from the interior of the hat between the body of the strip and the head.

LEONARD SZUMKOWSKI.